United States Patent
Li et al.

(10) Patent No.: US 8,711,303 B2
(45) Date of Patent: Apr. 29, 2014

(54) LIQUID CRYSTAL DISPLAY PANEL

(75) Inventors: Yi Li, Yongin (KR); Seong-Jun Lee, Yongin (KR); Yong-Kyu Jang, Yongin (KR); Jae-Young Lee, Yongin (KR); Ju-Yeon Seo, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 319 days.

(21) Appl. No.: 13/178,950

(22) Filed: Jul. 8, 2011

(65) Prior Publication Data

US 2012/0062828 A1 Mar. 15, 2012

(30) Foreign Application Priority Data

Sep. 13, 2010 (KR) .................. 10-2010-0089460

(51) Int. Cl.
*G02F 1/1333* (2006.01)
(52) U.S. Cl.
USPC ............... 349/110; 349/46; 349/47; 349/56; 349/84; 349/104
(58) Field of Classification Search
USPC ............. 349/43, 46, 47, 56, 84, 104, 110
See application file for complete search history.

(56) References Cited

U.S. PATENT DOCUMENTS

| | | | |
|---|---|---|---|
| 6,504,592 B1 | 1/2003 | Takatori et al. | |
| 6,538,713 B1 | 3/2003 | Yanagawa et al. | |
| 6,954,248 B2 * | 10/2005 | Song et al. | 349/142 |
| 7,714,960 B2 * | 5/2010 | Na et al. | 349/110 |
| 2001/0055074 A1 | 12/2001 | Komatsu | |
| 2002/0131005 A1 | 9/2002 | Yang | |
| 2006/0132684 A1 | 6/2006 | Tanaka | |
| 2007/0213241 A1 | 9/2007 | St. Clair | |
| 2007/0285590 A1 | 12/2007 | Wu et al. | |
| 2009/0231531 A1 | 9/2009 | Yoo et al. | |

FOREIGN PATENT DOCUMENTS

| | | |
|---|---|---|
| JP | 2001-264784 | 9/2001 |
| KR | 1999-011210 | 2/1999 |
| KR | 10-2006-0060573 | 6/2006 |
| KR | 10-2009-0010026 A | 1/2009 |

\* cited by examiner

*Primary Examiner* — Jennifer Doan
(74) *Attorney, Agent, or Firm* — Robert E. Bushnell, Esq.

(57) ABSTRACT

A liquid crystal display panel that includes a number of pixel electrodes formed on a substrate and are located in a pixel region defined by gate lines and data lines that cross the gate lines. Each of the pixel electrodes located in the pixel region includes a number of sides, and at least one of the sides includes oblique lines and a protrusion formed by the oblique lines, and the pixel electrodes located in the pixel region and adjacent to each other in a first direction form a separation space that includes at least one protrusion, and a width of the separation space gradually reduces and gradually increases in a second direction crossing the first direction, and a singular point that controls the texture of liquid crystals is located at the narrowest width of the separation space.

27 Claims, 10 Drawing Sheets

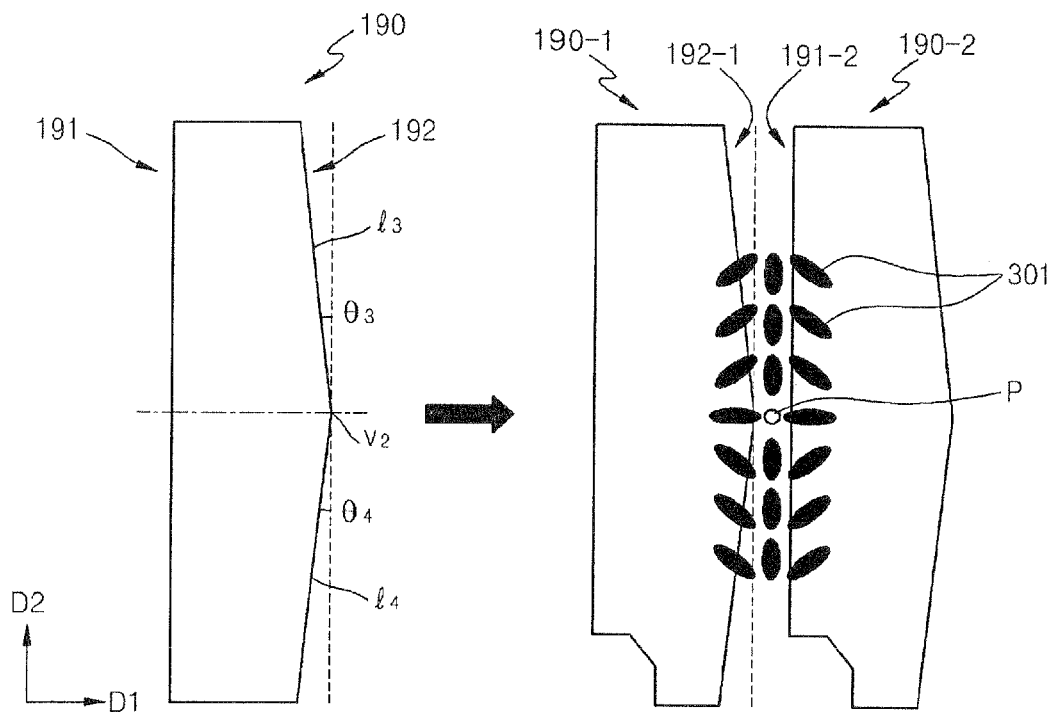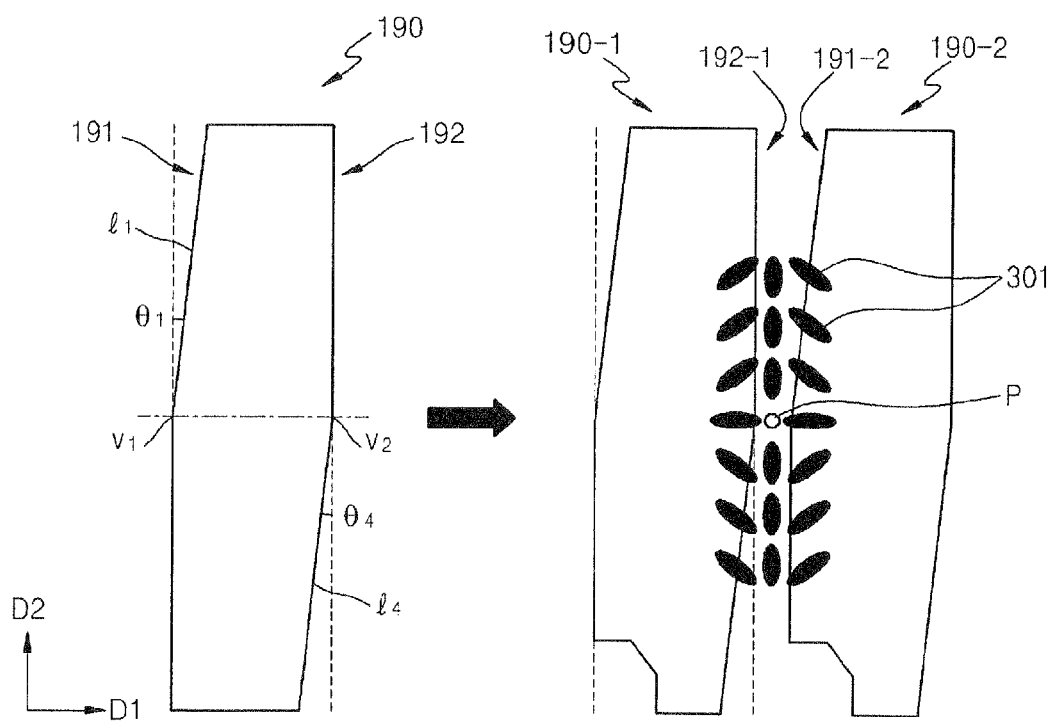

FIG. 15
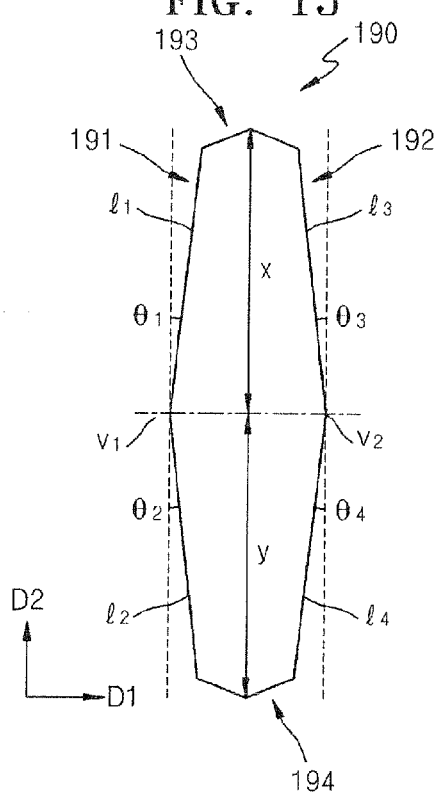
FIG. 16
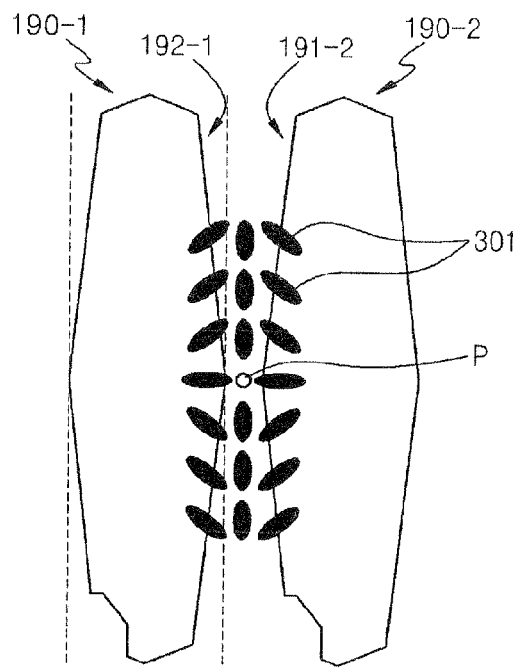
FIG. 17
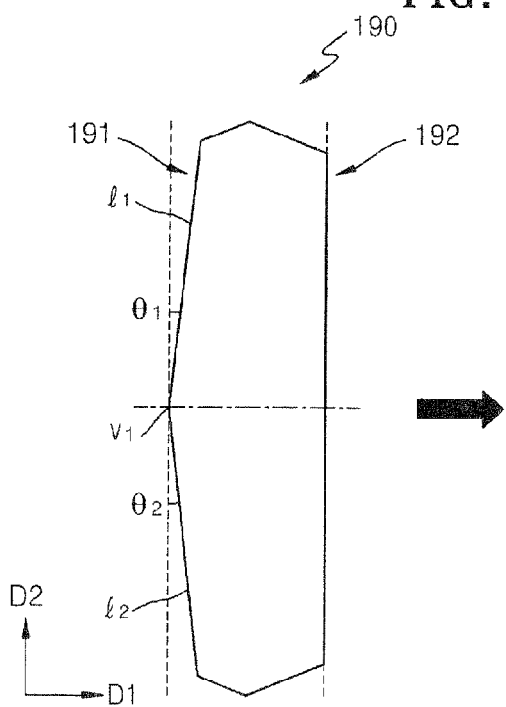
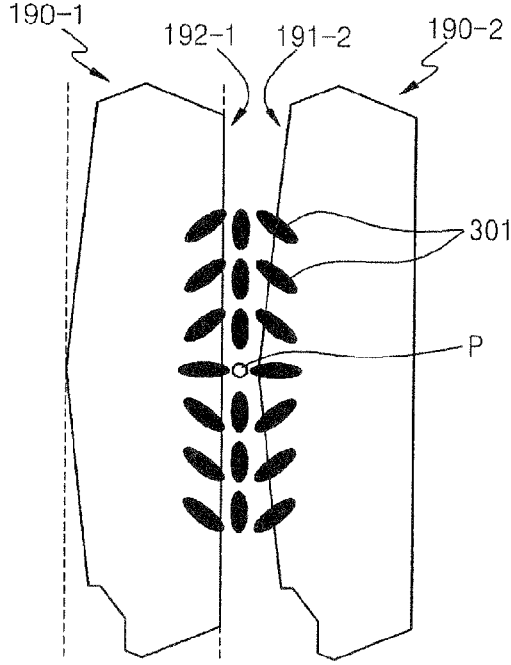

LIQUID CRYSTAL DISPLAY PANEL

CLAIM OF PRIORITY

This application makes reference to, incorporates the same herein, and claims all benefits accruing under 35 U.S.C. §119 from an application earlier filed in the Korean Intellectual Property Office on Sep. 13, 2010 and there duly assigned Serial No. 10-2010-0089460.

BACKGROUND OF THE INVENTION

1. Field of the Invention

The general inventive concept relates to liquid crystal display panels.

2. Description of the Related Art

A liquid crystal display is a flat display that includes two display panel sheets on which field generation electrodes, such as a pixel electrode and a common electrode, and a liquid crystal layer between the field generation electrodes are formed. The liquid crystal display displays an image such that an electric field is generated on the liquid crystal layer by applying a voltage to the field generation electrodes, and thus, the direction of liquid crystal molecules in the liquid crystal layer is determined to control polarized light.

Of the liquid crystal display, vertically-aligned mode liquid crystal displays have been developed. In the vertically-aligned mode, an axis of crystal molecules are arranged vertical with respect to a display panel when there no electric field is applied.

In a vertically-aligned mode liquid crystal display, securing a viewing angle of light is an important matter. For this, a method of forming a cutting unit having fine slits on an electrical field generation electrode or protrusions on the electrical field generation electrode is used. The cutting unit or the protrusions determine a tilting direction of liquid crystal molecules, and thus, the viewing angle can be increased by spreading the tilting direction of the liquid crystal molecules in various directions by appropriately disposing the cutting unit or the protrusions.

When a cutting unit having fine slits is formed on the electrical field generation electrode, although the effect of a tilt direction determining member is not significant in a region such as an edge of a pixel region, an irregular texture can be generated in a region such as the center region of the pixel region where a plurality of tilt direction determining members affect each other. The quality of the display is degraded due to the irregular texture.

The above information disclosed in this Related Art section is only for enhancement of understanding of the background of the invention and therefore it may contain information that does not form the prior art that is already known to a person of ordinary skill in the art.

SUMMARY OF THE INVENTION

To address the above and/or other problems, the present invention provides a liquid crystal display panel in which quality degradation caused by irregular texture of liquid crystals is prevented.

According to one aspect of the present invention, there is provided a liquid crystal display panel that may include a plurality of pixel electrodes that are formed on a substrate and are located in a pixel region defined by gate lines and data lines that cross the gate lines, wherein each of the pixel electrodes located in the pixel region includes a plurality of sides, and at least one of the sides includes oblique lines and a protrusion formed by the oblique lines, and the pixel electrodes that are located in the pixel region and are adjacent to each other in a first direction form a separation space that includes at least one protrusion, and a width of the separation space gradually reduces and gradually increased in a second direction crossing the first direction, and a singular point that controls the texture of liquid crystals is located at the narrowest width of the separation space.

The singular point may be fixed on the position where the width of the separation space is the smallest.

An upper space and a lower space of the separation space separated with respect to the location where the width of the separation space is the smallest may have substantially the same space area.

The protrusions correspond to the location where the width of the separation space may be the smallest.

The protrusions may be located on a point where an upper height x of the pixel electrode with respect to a lower height y of the pixel electrode is $0.9 < x/y < 1.1$ with respect to the protrusion.

The protrusions may be located on a point where the upper height x and the lower height y of the pixel electrode are equal with respect to the protrusion.

An oblique angle formed between the second direction and the oblique lines may be greater than 0° and may be less than 5°.

Each of the pixel electrodes may be symmetrical about an axis that is parallel to the first direction in the center of the pixel electrode, and the separation space may be symmetrical about an axis that is parallel to the first direction at the location where the separation space is the narrowest.

The pixel electrode may be symmetrical about an axis that is parallel to the second direction at the center of the pixel electrode, and the separation space may be symmetrical about an axis that is parallel to the second direction at a location where the separation space is the narrowest.

The pixel electrode may be point-symmetric with respect to the center of the pixel electrode, and the separation space is point-symmetric with respect to the location where the separation space is the narrowest.

The pixel electrode may include first and second sides disposed on edges along the second direction, wherein the first side includes first and second oblique lines that form an oblique angle with respect to the second direction; and a first protrusion formed on a position where the first and second oblique lines meet each other.

The oblique angle of the first oblique line may be equal to that of the second oblique line.

The first oblique line may be formed on an upper side of the pixel electrode with respect to the first protrusion, and the second oblique line may be formed on a lower side of the pixel electrode with respect to the first protrusion.

The height x1 of the first oblique line with respect to the upper height x of the pixel electrode may be $0.2 < x1/x \leq 1$.

The height y1 of the second oblique line with respect to the lower height y of the pixel electrode may be $0.2 < y1/y \leq 1$.

The second side may extend parallel to the second direction.

The second side may include: third and fourth oblique lines that form an oblique angle with respect to the second direction; and a second protrusion on a location where the third and fourth oblique lines meet each other.

The oblique angle of the third oblique line may be equal to that of the fourth oblique line.

The first and fourth oblique lines may be formed facing each other with respect to the center of the pixel electrode, and the second and third oblique lines may be formed facing each other with respect to the center of the pixel electrode, wherein the oblique angle of the first oblique line may be equal to that of the fourth oblique line, and the oblique angle of the second oblique line may be equal to that of the third oblique line.

The height of the third oblique line may be equal to that of the first oblique line.

The height of the fourth oblique line may be equal to that of the second oblique line.

The first and second protrusions may be located on the same line.

The pixel electrode may include a first side and a second side facing each other on edges of the pixel electrode in the second direction, wherein the first side includes a first protrusion and a first oblique line formed on an upper side of the first protrusion with respect to the first protrusion, and the second side includes a second protrusion and a second oblique line formed on a lower side of the second protrusion.

The oblique angle of the first oblique line may be equal to that of the second oblique line.

The first and second protrusions may be disposed on the same line.

The height x1 of the first oblique line with respect to the height x of the pixel electrode formed on an upper side of the first protrusion with respect to the first protrusion may be $0.2<x1/x\leq1$.

The height y1 of the second oblique line with respect to the height y of the pixel electrode formed on a lower side of the second protrusion with respect to the second protrusion may be $0.2<y1/y\leq1$.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 5 through 8 are cross-sectional views of pixel electrodes and the arrangements of the pixel electrodes, according to other embodiments of the present invention;

FIG. 15 is a schematic cross-sectional view of a pixel electrode according to another embodiment of the present invention;

FIG. 16 is a schematic cross-sectional view showing the arrangement of the pixel electrodes of FIG. 15 and the arrangement of liquid crystal molecules according to the arrangement of the pixel electrodes of FIG. 15; and FIGS. 17 through 20 are schematic cross-sectional views of a pixel electrode according to another embodiment of the present invention.

DETAILED DESCRIPTION OF THE INVENTION

Figure 1:
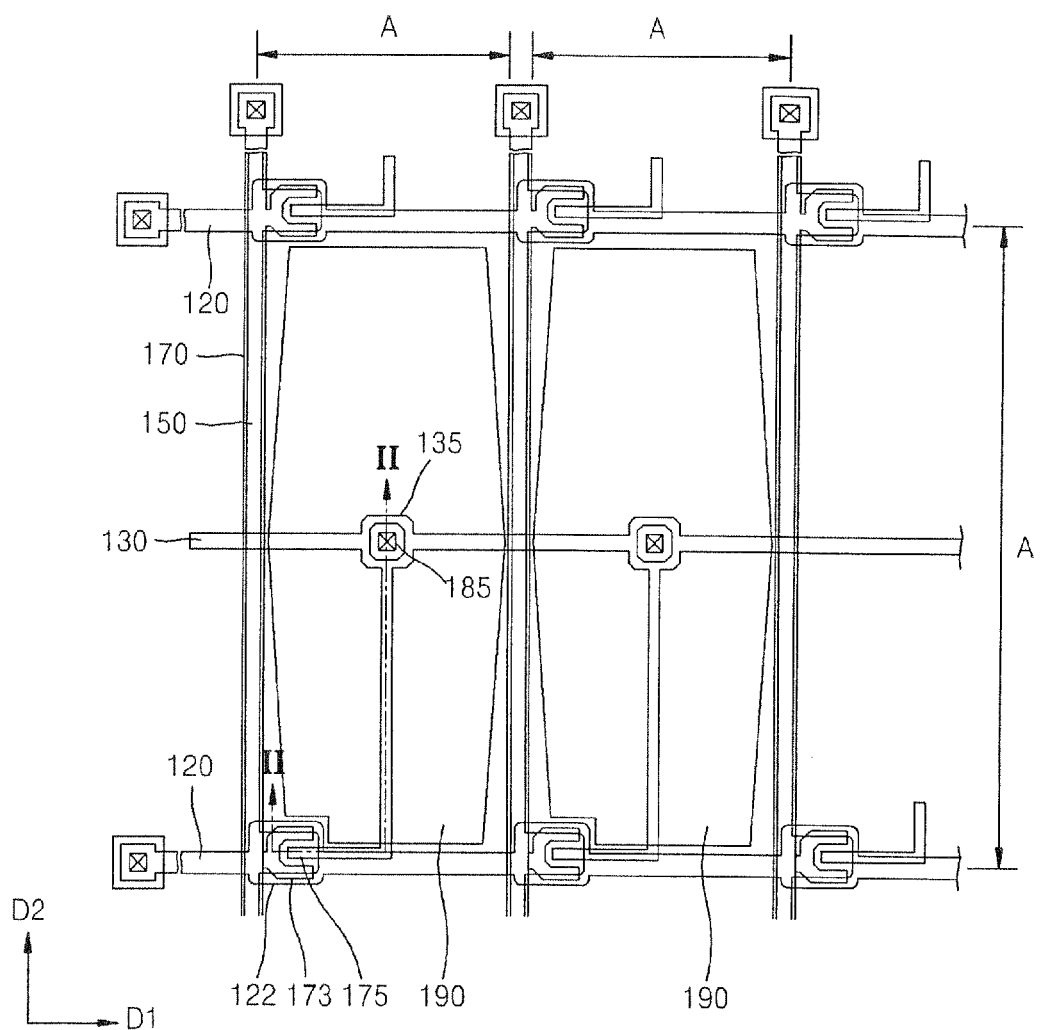
FIG. 1 is a schematic plan view of a liquid crystal display panel according to an embodiment of the present invention.

The present invention will now be described more fully with reference to the accompanying drawings in which exemplary embodiments of the invention are shown. As those skilled in the art would realize, the described embodiments may be modified in various different ways, all without departing from the spirit or scope of the principles for the present invention.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

Figure 2:
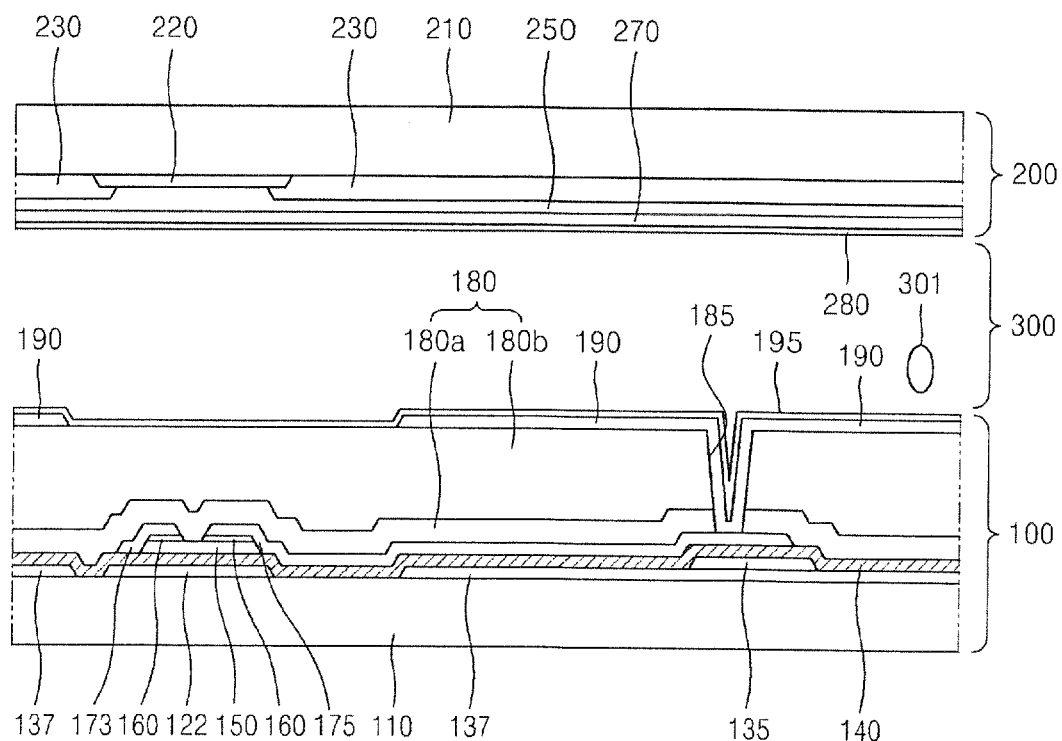
FIG. 2 is a cross-sectional view taken along the line II-II of FIG. 1.

FIG. 1 is a schematic plan view of a liquid crystal display panel according to an embodiment of the present invention. FIG. 2 is a cross-sectional view taken along the line II-II of FIG. 1.

Referring to FIGS. 1 and 2, the liquid crystal display panel according to the present embodiment of the present invention may include a thin-film transistor (TFT) substrate 100, a common electrode substrate 200, and a liquid crystal layer 300 interposed between the TFT substrate 100 and the common electrode substrate 200.

The TFT substrate 100 may include a plurality of gate lines 120 extending in a first direction D1, a plurality of data lines 170 extending across the gate lines 120 in a second direction D2, and a pixel electrode 190 formed in a pixel region A defined by the gate lines 120 and the data lines 170, which are formed on a first substrate 110. A sustain electrode line 130 may be formed extending in the same direction as the gate lines 120.

Referring to FIG. 2, a sustain electrode 137 is formed on the first substrate 110. The sustain electrode 137 may be formed of a transparent conductive material such as indium tin oxide (ITO) or indium zinc oxide (IZO).

The gate lines 120 may be formed extending in the first direction D1 (refer to FIG. 1). The gate lines 120 may be formed in plurality separated from each other by predetermined gaps, and a portion of the gate lines 120 protrudes to form a gate electrode 122.

The gate lines 120 may be formed of at least one metal selected from the group consisting of Al, Ag, Nd, Cr, Ti, Ta, and Mo. The gate lines 120 may have a single-layer or a multi-layer structure in which a plurality of metal layers are stacked.

The data lines 170 may be formed extending in the second direction D2 (refer to FIG. 1). The data lines 170 may be formed in plurality separated from each other by predetermined gaps, and a portion of the data lines 170 protrudes to form a source electrode 173.

The data lines 170 may be formed of the metals used to form the gate lines 120, and may also have a single-layer or a multi-layer structure.

The sustain electrode line 130 may be formed extending in the first direction D1 (refer to FIG. 1). The sustain electrode line 130 may be located between gate lines 120 adjacent to each other, and may have the same distance to each of the gate lines 120. The sustain electrode line 130 may include an expanding unit 135 disposed at the center of the pixel region A.

The sustain electrode line 130 contacts the sustain electrode 137 to be electrically connected to each other. The sustain electrode 137 receives a voltage through the sustain electrode line 130.

A line-type semiconductor 150 extends across the gate lines 120 and the sustain electrode line 130 in the second direction D2 (refer to FIG. 1). A portion of the line-type semiconductor 150 protrudes towards the gate electrode 122.

A TFT includes the gate electrode 122 connected to the gate line 120, the source electrode 173 connected to the data line 170, a drain electrode 175 connected to the pixel electrode 190. The TFT may also include a gate insulating film 140, the line-type semiconductor 150, and an ohmic contact layer 160, which are sequentially formed in the stated order between the gate electrode 122 and the source and drain electrodes 173 and 175.

A protective film 180 may be formed on the TFT. The protective film 180 may include a lower film 180a formed of an inorganic insulating material such as silicon nitride or silicon oxide and an upper film 180b formed on an organic insulating material. In the current embodiment, the protective film 180 has a stack structure in which two films are stacked. However, the present invention is not limited thereto, and the protective film 180 may be formed in a single-layer structure.

A contact hole 185 may be formed in the protective film 180. The pixel electrode 190 may be formed on the protective film 180. The pixel electrode 190 and the sustain electrode 137 constitute a storage capacitor together with the expanding unit 135 through the contact hole 185, with the gate insulating film 140 between the pixel electrode 190 and the sustain electrode 137. When the sustain electrode 137 is formed of a transparent conductive film, the capacity of the storage capacitor can be increased and the opening ratio may not be reduced.

The pixel electrode 190 may be formed in a pixel region A defined by the gate lines 120 and the data lines 170. The pixel electrode 190 may be connected to the drain electrode 175 through the contact hole 185. The pixel electrode 190 may be formed of a transparent conductive material such as ITO or IZO.

The pixel electrodes 190 may be disposed parallel to each other in one direction. First through fourth oblique lines $l_1$ through $l_4$ (refer to FIG. 3) and first and second protrusions $v_1$ and $v_2$ (refer to FIG. 3) may be formed on sides of the pixel electrode 190, which will be described later, to fix singular points of liquid crystal molecules 301 between the adjacent pixel electrodes 190. The sides of the pixel electrode 190 are not parallel to each other by the first through fourth oblique lines $l_1$ through $l_4$ and the first and second protrusions $v_1$ and $v_2$. Thus, widths of the separation space between the pixel electrodes 190 are not uniform. The singular point of the liquid crystal molecules 301 is fixed at the smallest width of the separation space. The shape of the pixel electrodes 190 and the separation space between the pixel electrodes 190 will be described in detail with reference to FIGS. 3 through 20.

A lower orientation film 195 may be formed on the pixel electrode 190. Also, the lower orientation film 195 may be a vertical orientation film.

The common electrode substrate 200 may include a black matrix 220 formed on a second substrate 210, a color filter 230 that provides colors to light, and a common electrode 270.

The black matrix 220 may be located between the adjacent color filters 230 or on an edge of the pixel region A. The black matrix 220 increases the visibility of color realized in the pixel region A, and prevents optical interference between the pixel regions A and an optical leakage phenomenon of the pixel electrode 190.

The color filter 230 provides colors to light that passes through the liquid crystal layer 300 from a light source. The color filter 230 may be formed of a photosensitive organic material. The color filter 230 is formed by repeating red R, green G, and blue B filters in each of the pixel regions A.

An overcoat film 250 is formed on the color filter 230 and the black matrix 220 to protect the color filter 230.

The common electrode 270 may be formed on the overcoat film 250, and an upper orientation film 280 may be formed on the common electrode 270. The upper orientation film 280 may be a vertical orientation film.

The liquid crystal layer 300 includes the liquid crystal molecules 301. The liquid crystal molecules 301 may have a negative dielectric anisotropy.

Since the pixel electrode 190 is electrically connected to the drain electrode 175 through the contact hole 185, the pixel electrode 190 receives a data voltage from the drain electrode 175. The pixel electrode 190 to which a data voltage is applied generates an electric field together with the common electrode 270 of the common electrode substrate 200 to which a common voltage is applied.

According to the generated electric field, the long axes of the liquid crystal molecules 301 tend to change their direction to be perpendicular to the direction of the electric field. According to the degree of obliqueness of the liquid crystal molecules 301, the degree of polarization of light incident to the liquid crystal layer 300 is changed, and the change of polarized light is showed as a change of transmittance ratio by a polarizer (not shown).

The configuration of the liquid crystal display panel of current embodiment has been described above with respect to FIGS. 1 and 2. However, the present invention is not limited thereto, and various modifications of the configuration of the liquid crystal display panel are possible.

Figure 3:
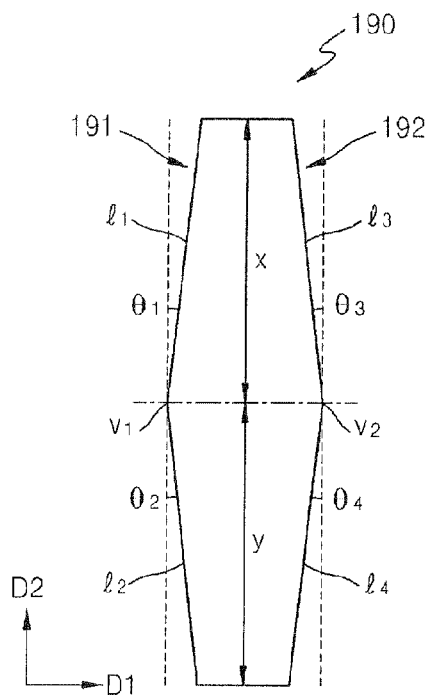
FIG. 3 is a schematic cross-sectional view of a pixel electrode of FIG. 1.
Figure 4:
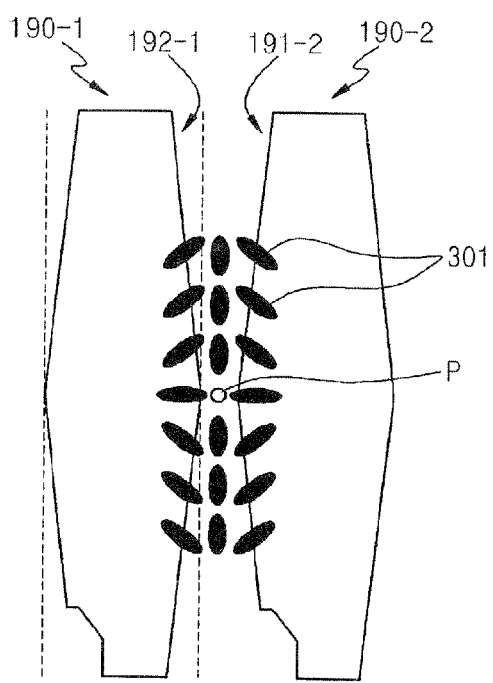
FIG. 4 is a schematic cross-sectional view showing the arrangement of the pixel electrodes of FIG. 3 and the arrangement of liquid crystal molecules according to the arrangement of the pixel electrodes.

FIG. 3 is a schematic cross-sectional view of the pixel electrode 190 of FIG. 1. FIG. 4 is a schematic cross-sectional view showing the arrangement of the pixel electrodes 190 of FIG. 3 and the arrangement of the liquid crystal molecules 301 according to the arrangement of the pixel electrodes 190.

Referring to FIG. 3, the pixel electrode 190 includes a first side 191 and a second side 192 facing the first side 191. The first and second sides 191 and 192 include the first through fourth oblique lines $l_1$ through $l_4$ and the first and second protrusions $v_1$ and $v_2$.

The first and second oblique lines $l_1$ and $l_2$ that form an oblique angle with respect to the gate lines 120 and the data lines 170 are formed on the first side 191. The first protrusion $v_1$ may be formed at a point where the first and second oblique lines $l_1$ and $l_2$ meet.

Like on the first side 191, the third and fourth oblique lines $l_3$ and $l_4$ that form an oblique angle with respect to the gate lines 120 and the data lines 170 are formed on the second side 192.

The second protrusion v2 may be formed at a point where the third and fourth oblique lines $l_3$ and $l_4$ meet.

The width of the pixel electrode 190 gradually reduces towards the edges from the center of the pixel electrode 190 by the first through fourth oblique lines 11 through 14 formed on the first and second sides 191 and 192.

The oblique angles θi formed by the first through fourth oblique lines 11 through 14 with respect to the data lines 170 are expressed as the following Equation 1.

$$0° < \theta_i < 5°, i=1,2,3,4 \quad \text{[Equation 1]}$$

Preferably, the first through fourth oblique lines 11 through 14 are formed so that θi is 1.2 degrees.

The pixel electrode 190 may be formed to be symmetrical about an axis that is parallel to the first direction D1 and the second direction D2 by forming the oblique angles that are formed between the first through fourth oblique lines 11 through 14 and the data lines 170 to have an equal angle value $\theta_1 = \theta_2 = \theta_3 = \theta_4$.

The first protrusion $v_1$ and the second protrusion $v_2$ are located on the same line. When the pixel electrode 190 is divided into an upper pixel electrode 190 and a lower pixel electrode 190 with respect to the first and second protrusions $v_1$ and $v_2$, the relationship between the height x of the upper pixel electrode 190 with respect to the height y of the lower pixel electrode 190 is expressed as the following Equation 2.

$$0.9 < \frac{x}{y} < 1.1 \quad \text{[Equation 2]}$$

When the first and second protrusions $v_1$ and $v_2$ are located on positions that satisfy Equation 2, a symmetrical arrangement of the liquid crystal molecules 301 can be formed. Preferably, the first and second protrusions $v_1$ and $v_2$ are arranged on the axis that passes through the center of the pixel electrode 190, that is, on a position where x=y.

Referring to FIG. 4, a second side 192-1 of a first pixel electrode 190-1 and a first side 191-2 of a second pixel electrode 190-2 are disposed facing each other, and a separation space is formed between the first and second pixel electrodes 190-1 and 190-2. Point P, which is the center of the separation space, is located between the first and second protrusions $v_1$ and $v_2$, and a singular point that controls the texture of the liquid crystal molecules 301 is fixed.

The separation space between the first and second pixel electrodes 190-1 and 190-2 is one-axis symmetric with respect to the point P, and an upper space and a lower space with respect to the point P are equal. Since the width of the first and second pixel electrodes 190-1 and 190-2 gradually reduces from the center toward their edges, the width of the separation space between the first and second pixel electrodes 190-1 and 190-2 gradually reduces and again gradually increased in the second direction D2.

The separation space between the first and second pixel electrodes 190-1 and 190-2 has the smallest width between the first and second protrusions $v_1$ and $v_2$. The singular point of the liquid crystal molecules 301 is fixed on the point P, which is the center between the first and second protrusions $v_1$ and $v_2$, and the liquid crystal molecules 301 are regularly arranged with respect to the point P, thereby enabling the stabilizing of the texture of liquid crystals.

According to the current embodiment, the oblique angle $\theta_1$ of the first oblique line 1 and the oblique angle $\theta_3$ of the third oblique line $l_3$ may be formed equal, and the oblique angle $\theta_2$ of the second oblique line $l_2$ and the oblique angle $\theta_4$ of the fourth oblique line $l_4$ may be formed equal. In this case, the first and third oblique lines $l_1$ and $l_3$ are parallel to each other, and the second and fourth oblique lines $l_2$ through $l_4$ are parallel to each other with respect to the center of the first and second pixel electrodes 190-1 and 190-2. In this case, the upper space and the lower pace of the separation space between the first and second pixel electrodes 190-1 and 190-2 is point-symmetric with respect to the point P, and the upper space and the lower space are formed to have the same space area.

FIGS. 5 through 8 are cross-sectional views of pixel electrodes and the arrangements of the pixel electrodes, according to other embodiments of the present invention.

Figure 5:
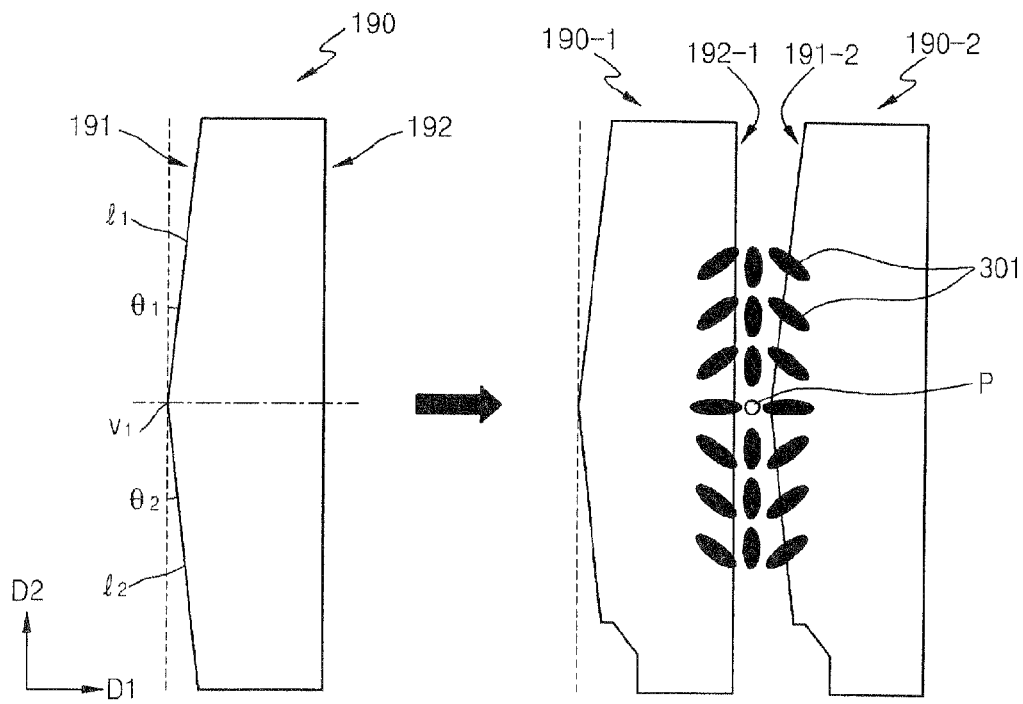

Referring to FIG. 5, the pixel electrode 190 is different from the pixel electrode 190 of FIG. 3 in that the first and second oblique lines $l_1$ and $l_2$ and the first protrusion $v_1$ are formed on the first side 191 of the pixel electrode 190 and the second side 192 extends parallel to the second direction D2.

Also, in the current embodiment, a singular point of the liquid crystal molecules 301 is fixed on a point P, which is the center of a separation space between the first and second pixel electrodes 190-1 and 190-2. An upper space and a lower space of the separation space have the same space area with respect to the point P, and the separation space is symmetrical about an axis parallel to the first direction.

In the separation space between the first and second pixel electrodes 190-1 and 190-2, a width between the first protrusions $v_1$ formed on a second side 192-1 of the first pixel electrode 190-1 and a first side 191-2 of the second pixel electrode 190-2 is the smallest. The singular point of the liquid crystal molecules 301 is fixed on the point P located between the first protrusions $v_1$ formed on the second side 192-1 of the first pixel electrode 190-1 and the first side 191-2 of the second pixel electrode 190-2.

The pixel electrode 190 of FIG. 6 is different from the pixel electrode 190 of FIG. 5 in that the third and fourth oblique lines $l_3$ and $l_4$ and the second oblique line $l_2$ are formed on the second side 192 and the first side 191 extends parallel to the second direction.

Referring to FIG. 7, the first side 191 and the second side 192 of the pixel electrode 190 respectively include the first and second protrusions $v_1$ and $v_2$ and the first and fourth oblique lines $l_1$ and $l_4$. The first oblique line $l_1$ is formed on an upper part of the first protrusion v on the first side 191, and the fourth oblique line $l_4$ is formed on a lower part of the second protrusion $v_2$ on the second side 192. The oblique angles $\theta_1$ and $\theta_4$ of the first and fourth oblique lines $l_1$ and $l_4$ may be formed to be equal.

Also, in the current embodiment, the singular point of the liquid crystal molecules 301 is fixed on a point P, which is the center of a separation space between the first and second pixel electrodes 190-1 and 190-2. An upper space and a lower space of the separation space have the same space area and are symmetrical to each other with respect to the point P.

Figure 8:
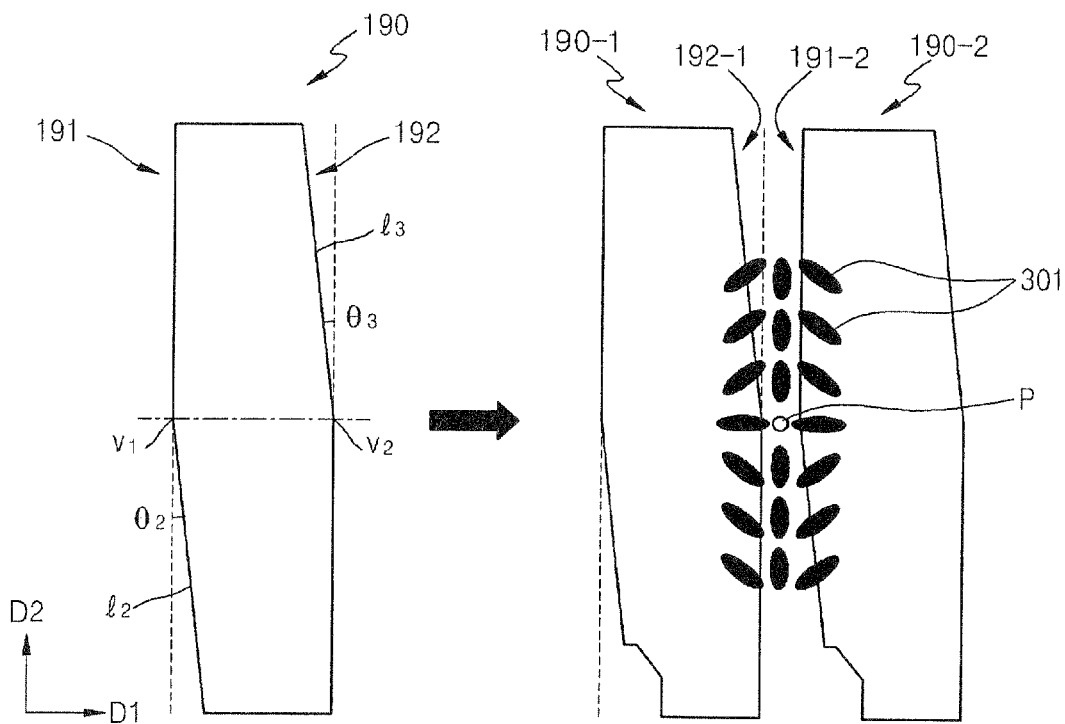

The pixel electrode 190 in FIG. 8 is different from the pixel electrode 190 of FIG. 7 in that the second oblique line $l_2$ formed on the first side 191 is located on a lower side of the first protrusion $v_1$, and the third oblique line $l_3$ formed on the second side 192 is located on an upper side of the second protrusion $v_2$.

Figure 9:
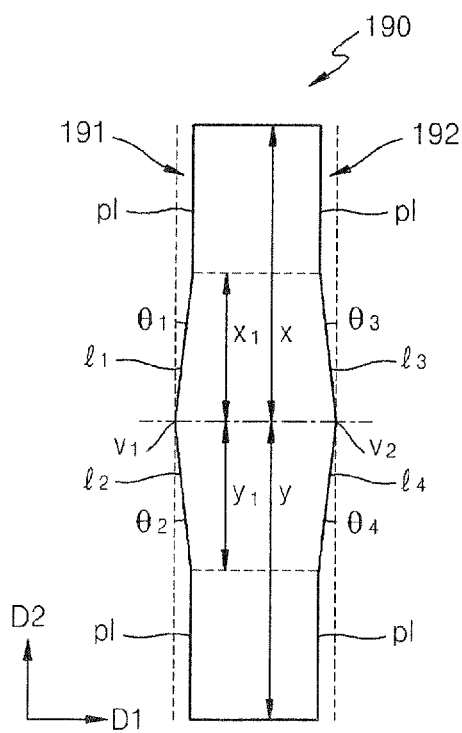
FIG. 9 is a schematic cross-sectional view of a pixel electrode according to another embodiment of the present invention.
Figure 10:
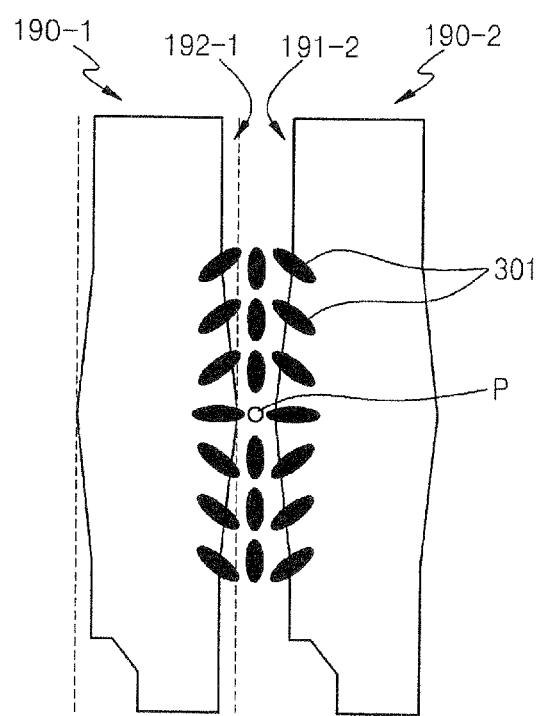
FIG. 10 is a schematic cross-sectional view showing the arrangement of the pixel electrodes of FIG. 9 and the arrangement of liquid crystal molecules according to the arrangement of the pixel electrodes of FIG. 9.

FIG. 9 is a schematic cross-sectional view of a pixel electrode 190 according to another embodiment of the present invention. FIG. 10 is a schematic cross-sectional view showing the arrangement of the pixel electrodes 190 and the arrangement of liquid crystal molecules 301 according to the arrangement of the pixel electrodes 190 of FIG. 9.

Referring to FIG. 9, in the pixel electrode 190 according to the present embodiment of the present invention, first through fourth oblique lines $l_1$ through $l_4$ and first and second protrusions $v_1$ and $v_2$ are formed on the first and second sides 191 and 192. The first through fourth oblique lines $l_1$ through $l_4$ are formed on locations where the oblique angles $\theta_1$ through $\theta_4$ of each of the first through fourth oblique lines $l_1$ through $l_4$ comply with the conditions and requirements of Equation 1, and the first and second protrusions $v_1$ and $v_2$ are formed on locations where they comply with the conditions and requirements of Equation 2.

However, according to the current embodiment, the pixel electrode 190 of FIG. 9 is different from the above embodiments in that ends of the first and second sides 191 and 192 include parallel sides p1 extending parallel to the second direction. For convenience of explanation, mainly the differences of the current embodiment versus previous embodiments will be described.

The first and second protrusions $v_1$ and $v_2$ are located on the same line. Referring to FIG. 10, which will be described later, the second protrusion $v_2$ of the first pixel electrode 190-1 and the first protrusion $v_1$ of the second pixel electrode 190-2 face each other. The singular point of the liquid crystal molecules 301 is fixed between the first and second protrusions $v_1$ and $v_2$.

The first and third oblique lines $l_1$ and $l_3$ are formed to have the same height x1, and the second and fourth oblique lines $l_2$ and $l_4$ are formed to have the same height y1. The height x1 of the first and third oblique lines $l_1$ and $l_3$ may have the following relationship as shown in Equation 3 with the height x of the upper pixel electrode 190.

$$0.2 < \frac{x_1}{x} \leq 1.0 \qquad \text{[Equation 3]}$$

The height y1 of the second and fourth oblique lines $l_2$ and $l_4$ may have the following relationship as shown in Equation 4 with the height y of the lower pixel electrode 190.

$$0.2 < \frac{y_1}{y} < 1.0 \qquad \text{[Equation 4]}$$

In the relationships of Equations 3 and 4, the case when the height x1 of the first and third oblique lines $l_1$ and $l_3$ and the height x of the upper pixel electrode 190 are equal x1=x, and the height y1 of the second and fourth oblique lines $l_2$ and $l_4$ and the height y of the lower pixel electrode 190 are equal y1=y is the same shape of the pixel electrode 190 described in reference to FIG. 3.

Referring to FIG. 10, the gradual narrowing and gradual widening of the width of the separation space between the first and second pixel electrodes 190-1 and 190-2 in the second direction is the same as the embodiment described with reference to FIGS. 3 and 4. Also, the second side 192-1 of the first pixel electrode 190-1 is disposed facing the first side 191-2 of the second pixel electrode 190-2, and a separation space is formed between the first and second pixel electrodes 190-1 and 190-2. A position where the first and second protrusions $v_1$ and $v_2$ face each other has the smallest width of the separation space. A singular point of the liquid crystal molecules 301 is fixed on the point P where the first and second protrusions $v_1$ and $v_2$ face each other. Since the liquid crystal molecules 301 are regularly arranged after the singular point is fixed on the point P, the texture of the liquid crystals can be stabilized.

FIGS. 11 through 14 are schematic cross-sectional views of a pixel electrode 190 and the arrangement of the pixel electrodes 190, according to another embodiment of the present invention.

Figure 11:
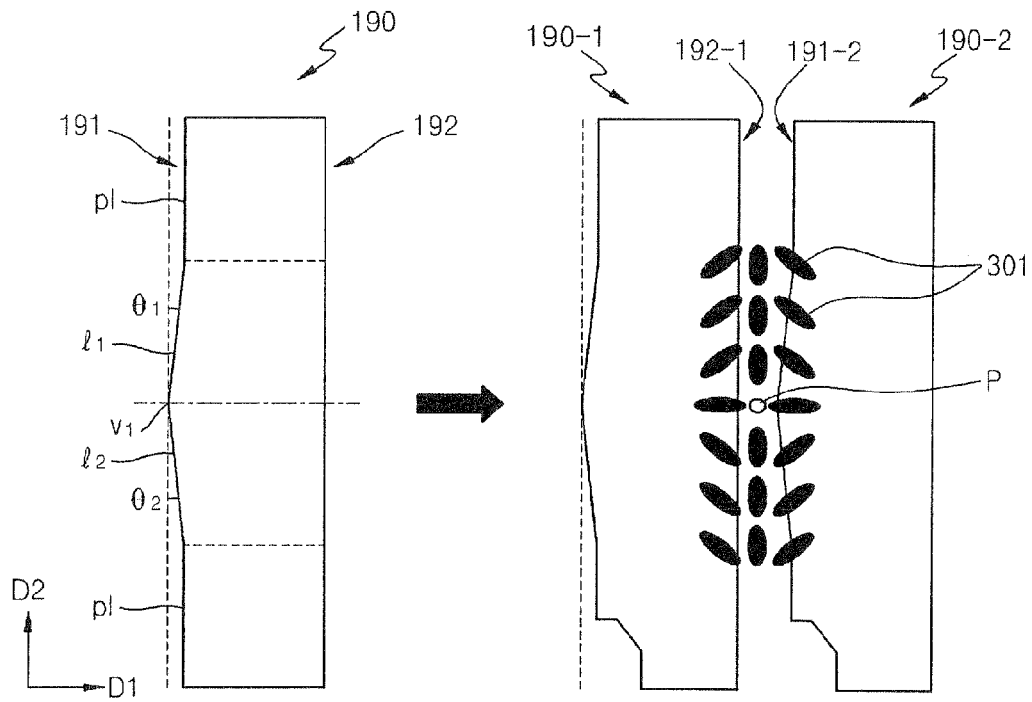
FIGS. 11 through 14 are schematic cross-sectional views of a pixel electrode according to another embodiment of the present invention.

Referring to FIG. 11, the pixel electrode 190 of FIG. 11 is different from the pixel electrode 190 of FIG. 9 in that the first and second oblique lines $l_1$ and $l_2$ and the first protrusion $v_1$ are formed only on the first side 191 of the pixel electrode 190, and the second side 192 extends parallel to the second direction. Also, ends of the first and second oblique lines $l_1$ and $l_2$ extend as parallel sides p1 to the second direction D2.

Also, in the current embodiment, a singular point of the liquid crystal molecules 301 is fixed on the point P, which is the center of the separation space between the first and second pixel electrodes 190-1 and 190-2. An upper space and a lower space of the separation space have the same space area with respect to the point P, and the separation space is symmetrical about an axis parallel to the first direction D1.

Figure 12:
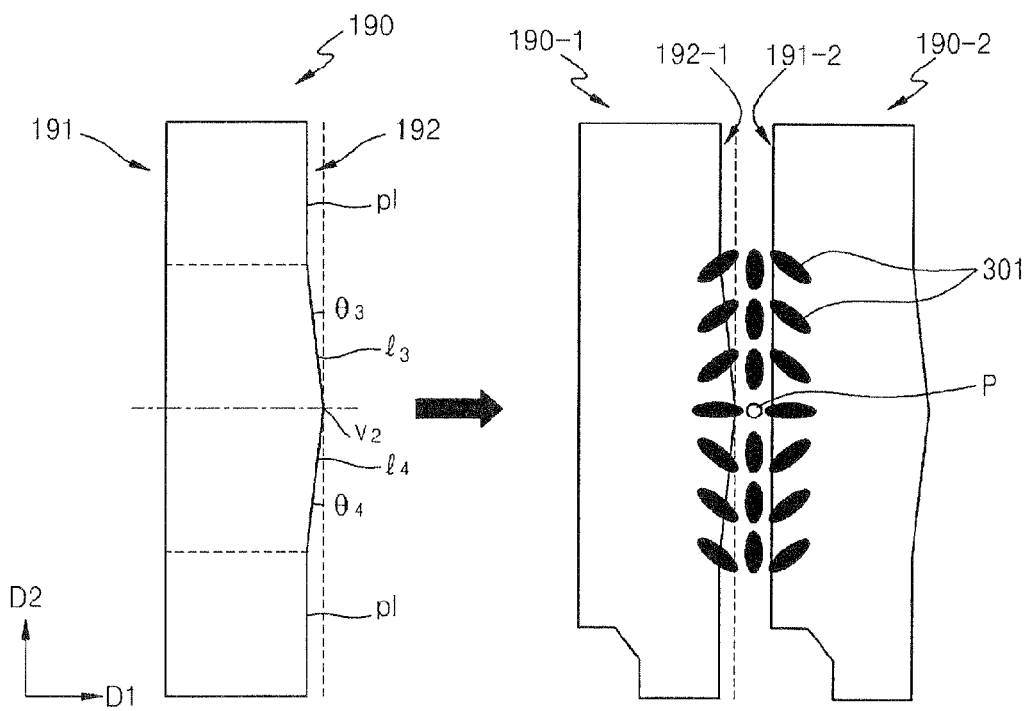

The pixel electrode 190 of FIG. 12 is different from the pixel electrode 190 of FIG. 11 in that the third and fourth oblique lines $l_3$ and $l_4$ and the second protrusion $v_2$ are formed only on the second side 192 of the pixel electrode 190, and the first side 191 extends parallel to the second direction D2.

Figure 13:
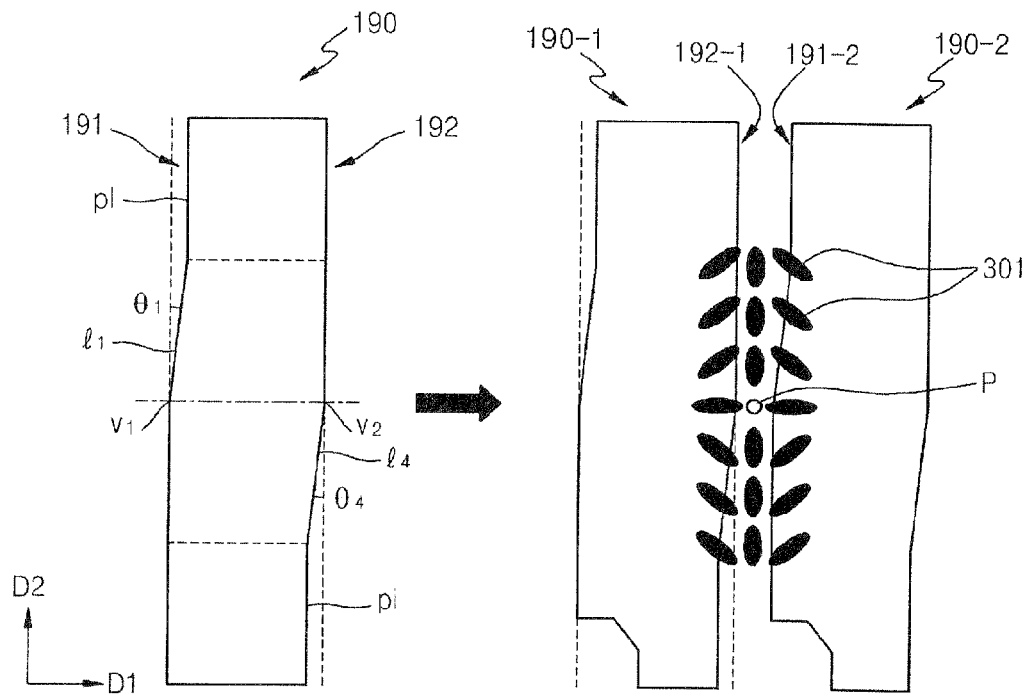

Referring to FIG. 13, the first side 191 and the second side 192 of the pixel electrode 190 respectively include first and second protrusions $v_1$ and $v_2$ and first and fourth oblique lines $l_1$ and $l_4$. The pixel electrode 190 of FIG. 13 is different from the pixel electrode 190 of FIG. 9 in that the first oblique line $l_1$ is formed on an upper side of the first protrusion $v_1$ on the first side 191, and the fourth oblique line $l_4$ is formed on a lower side of the second protrusion $v_2$. Ends of the third and fourth oblique lines $l_3$ and $l_4$ extend as parallel sides p1 to the second direction D2.

Also, in the current embodiment, a singular point of the liquid crystal molecules 301 is fixed on a point P, which is also the center of the separation space between the first and second pixel electrodes 190-1 and 190-2. An upper space and a lower space of the separation space have the same space area with respect to the point P, and the separation space is point-symmetric about point P.

Figure 14:
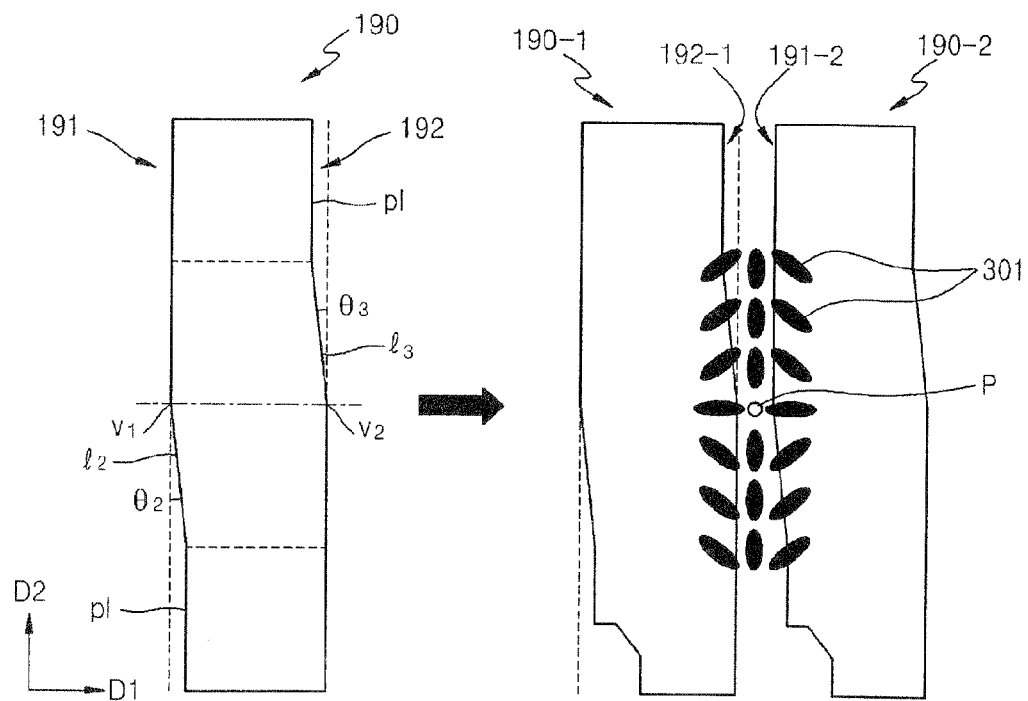

The pixel electrode 190 of FIG. 14 is different from the pixel electrode 190 of FIG. 13 in that the second oblique line $l_2$ formed on the first side 191 is located on a lower side of the first protrusion $v_1$ and the third oblique line $l_3$ formed on the second side 192 is located on an upper side of the second protrusion $v_2$.

FIG. 15 is a schematic cross-sectional view of a pixel electrode 190 according to another embodiment of the present invention. FIG. 16 is a schematic cross-sectional view showing the arrangement of the pixel electrodes 190 of FIG. 15 and the arrangement of liquid crystal molecules according to the arrangement of the pixel electrodes 190 of FIG. 15.

Referring to FIG. 15, in the pixel electrode 190 according to the present embodiment of the present invention, first through fourth oblique lines $l_1$ through $l_4$ and first and second protrusions $v_1$ and $v_2$ are formed on the first and second sides 191 and 192. The first through fourth oblique lines $l_1$ through $l_4$ are formed on locations where the oblique angles $\theta_1$ through $\theta_4$ of each of the first through fourth oblique lines $l_1$ through $l_4$ meet the conditions of Equation 1, and the first and second protrusions $v_1$ and $v_2$ are formed on locations where they meet the conditions of Equation 2.

However, the pixel electrode 190 according to the current embodiment has oblique lines on upper sides and lower sides.

The upper and lower sides of the pixel electrode 190 include oblique lines and protrusions according to the oblique lines. Also, in the current embodiment, as described with reference to FIG. 3, the first and second sides 191 and 192 include first through fourth oblique lines $l_1$ and $l_4$ and first and second protrusions $v_1$ and $v_2$ formed according to the first through fourth oblique lines $l_1$ and $l_4$.

Referring to FIG. 16, a singular point of the liquid crystal molecules 301 is fixed on a position of a separation space between the first and second pixel electrodes 190-1 and 190-2 where the first and second protrusions $v_1$ and $v_2$ face each other. Also, an upper space and a lower space of the separation space have the same space area with respect to the point P of the separation space between the first and second pixel electrodes 190-1 and 190-2.

FIGS. 17 through 20 are schematic cross-sectional views of pixel electrodes 190 and the arrangements of the pixel electrodes 190 according to another embodiment of the present invention.

Referring to FIG. 17, the pixel electrode 190 of FIG. 17 is different from the pixel electrode 190 of FIG. 15 in that the first and second oblique lines $l_1$ and $l_2$ and the first protrusion $v_1$ are formed only on the first side 191 of the pixel electrode 190, and the second side 192 extends parallel to the second direction D2.

Also, in the current embodiment, a singular point of the liquid crystal molecules 301 is fixed on a point P, which is the center of a separation space between the first and second pixel electrodes 190-1 and 190-2. An upper space and a lower space of the separation space separated with respect to the point P have the same space area, and are symmetrical about an axis parallel to the first direction D1.

Figure 18:
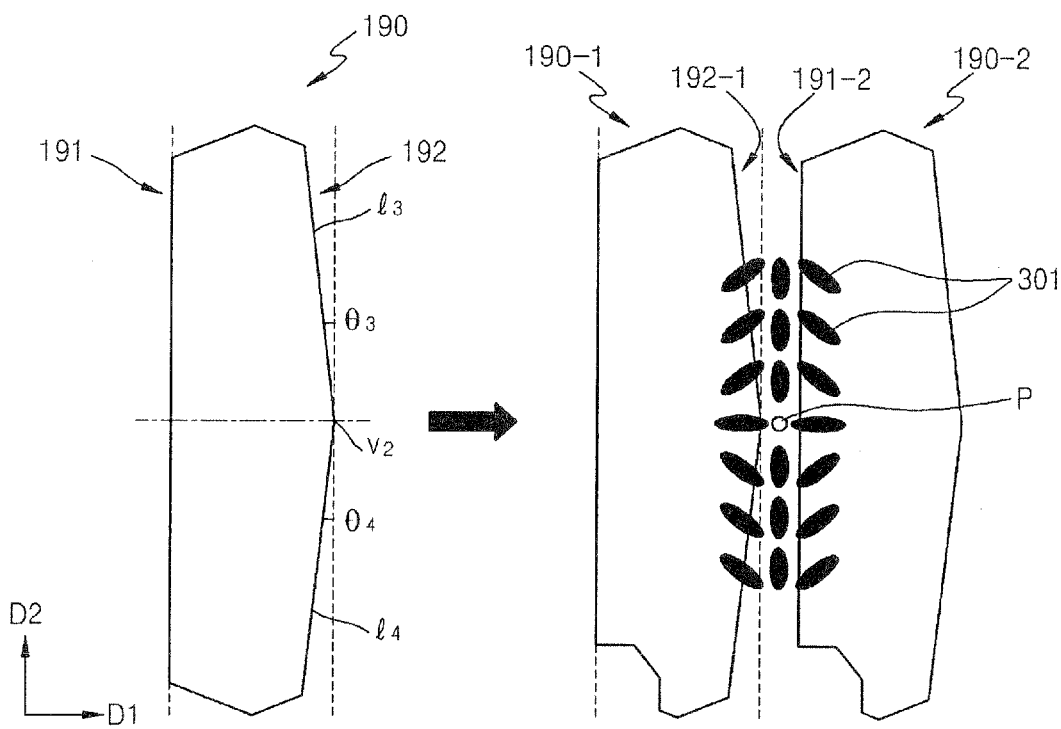

The pixel electrode 190 of FIG. 18 is different from the pixel electrode 190 of FIG. 17 in that the third and fourth oblique lines $l_3$ and $l_4$ and the second protrusion $v_2$ are formed only on the second side 192 of the pixel electrode 190, and the first side 191 extends parallel to the second direction D2.

The first and second sides 191 and 192 of the pixel electrode 190 respectively include first and second protrusions $v_1$ and $v_2$ and first and fourth oblique lines $l_1$ and $l_4$. However, the pixel electrode 190 of FIG. 19 is different from the pixel electrode 190 of FIG. 15 in that the first oblique line $l_1$ is formed on an upper side of the first protrusion $v_1$ on the first side 191, and the fourth oblique line $l_4$ is formed on a lower side of the second protrusion $v_2$ on the second side 192.

Also, in the current embodiment, a singular point of the liquid crystal molecules 301 is fixed on a point P, which is the center of a separation space between the first and second pixel electrodes 190-1 and 190-2. An upper space and a lower space of the separation space separated with respect to the point P have the same space area, and are point-symmetric with respect to the point P.

Figure 19:
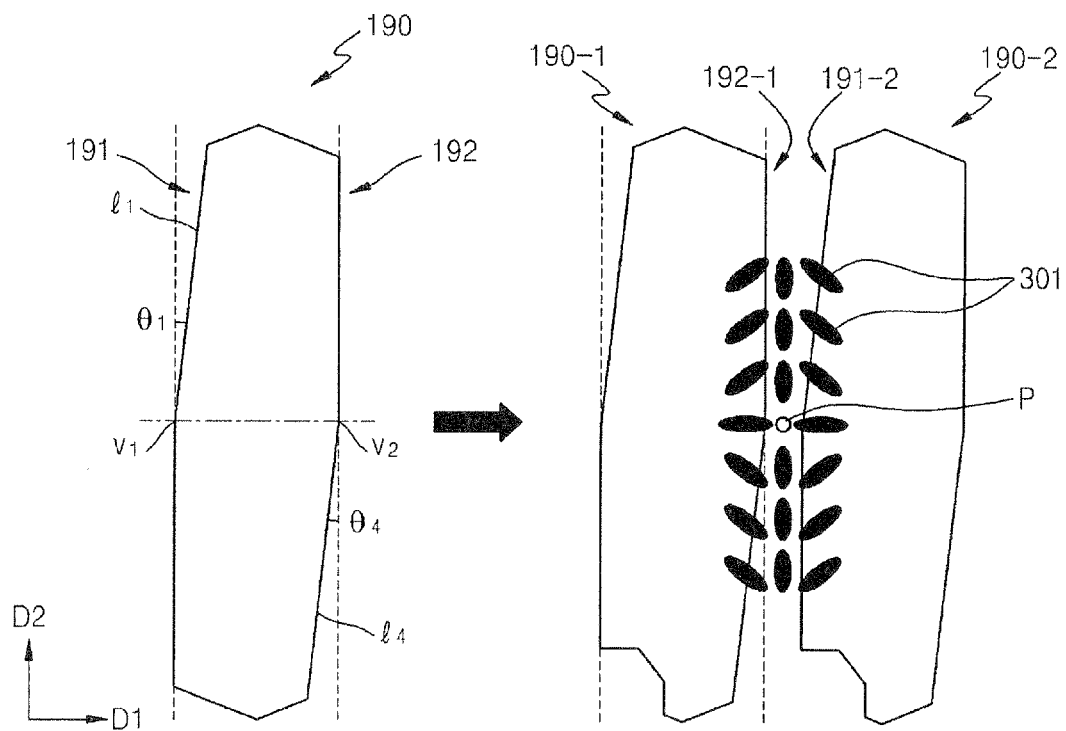
Figure 20:
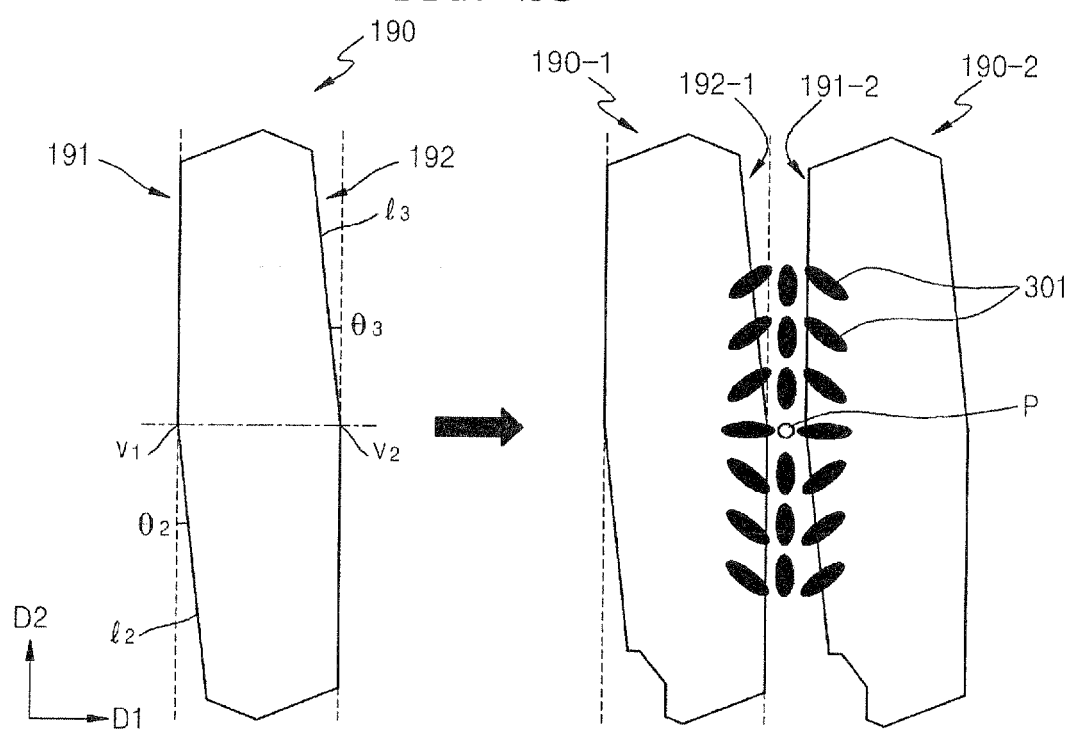

The pixel electrode 190 of FIG. 20 is different from the pixel electrode 190 of FIG. 19 in that the second oblique line $l_2$ formed on the first side 191 is located on a lower side of the first protrusion $v_1$, and the third oblique line $l_3$ formed on the second side 192 is located on an upper side of the second protrusion $v_2$.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:
1. A liquid crystal display panel, comprising:
a plurality of pixel electrodes that are formed on a substrate, said plurality of pixels are located in a pixel region defined by gate lines and data lines that cross the gate lines,
wherein each of the pixel electrodes located in the pixel region comprises a plurality of sides, and at least one of the sides comprises oblique lines and a protrusion formed by the oblique lines, and
the pixel electrodes located in the pixel region and adjacent to each other in a first direction form a separation space that comprises at least one protrusion, and a width of the separation space gradually reduces and then gradually increases in a second direction crossing the first direction, and a singular point that controls the texture of liquid crystals is located at a narrow width of the separation space.

2. The liquid crystal display panel of claim 1, wherein the singular point is fixed on the location where the width of the separation space is the smallest.

3. The liquid crystal display panel of claim 1, wherein an upper space and a lower space of the separation space separated with respect to the location where the width of the separation space, is the smallest have substantially the same space area.

4. The liquid crystal display panel of claim 1, wherein the protrusions correspond to the location where the width of the separation space is the smallest.

5. The liquid crystal display panel of claim 1, wherein the protrusions are located on a point where an upper height x of the pixel electrode with respect to a lower height y of the pixel electrode is 0.9<x/y<1.1 with respect to the protrusion.

6. The liquid crystal display panel of claim 5, wherein the protrusions are located on a point where the upper height x and the lower height y of the pixel electrode are equal with respect to the protrusion.

7. The liquid crystal display panel of claim 1, wherein an oblique angle formed between the second direction and the oblique lines, is greater than 0° and is less than 5°.

8. The liquid crystal display panel of claim 1, wherein each of the pixel electrodes is symmetrical about an axis that is parallel to the first direction in the center of the pixel electrode, and
the separation space is symmetrical about an axis that is parallel to the first direction at the location where the separation space is the narrowest.

9. The liquid crystal display panel of claim 8, wherein the pixel electrode is symmetrical about an axis that is parallel to the second direction at the center of the pixel electrode, and the separation space is symmetrical about an axis that is parallel to the second direction at a location where the separation space is the narrowest.

10. The liquid crystal display panel of claim 1, wherein the pixel electrode is point-symmetric with respect to the center of the pixel electrode, and the separation space is point-symmetric with respect to the location where the separation space is the narrowest.

11. The liquid crystal display panel of claim 1, wherein the pixel electrode comprises first and second sides disposed on edges along the second direction,
wherein the first side comprises:
first and second oblique lines that form an oblique angle with respect to the second direction; and a first protrusion formed on a position where the first and second oblique lines meet each other.

12. The liquid crystal display panel of claim 11, wherein the oblique angle of the first oblique line is equal to that of the second oblique line.

13. The liquid crystal display panel of claim 11, wherein the first oblique line is formed on an upper side of the pixel electrode with respect to the first protrusion, and the second oblique line is formed on a lower side of the pixel electrode with respect to the first protrusion.

14. The liquid crystal display panel of claim 13, wherein the height x1 of the first oblique line with respect to the upper height x of the pixel electrode is $0.2 < x1/x \leq 1$.

15. The liquid crystal display panel of claim 13, wherein the height y1 of the second oblique line with respect to the lower height y of the pixel electrode is $0.2 < y1/y \leq 1$.

16. The liquid crystal display panel of claim 11, wherein the second side extends parallel to the second direction.

17. The liquid crystal display panel of claim 11, wherein the second side comprises:

third and fourth oblique lines that form an oblique angle with respect to the second direction; and a second protrusion on a location where the third and fourth oblique lines meet each other.

18. The liquid crystal display panel of claim 17, wherein the oblique angle of the third oblique line is equal to that of the fourth oblique line.

19. The liquid crystal display panel of claim 17, wherein the first and fourth oblique lines are formed facing each other with respect to the center of the pixel electrode, the second and third oblique lines are formed facing each other with respect to the center of the pixel electrode, the oblique angle of the first oblique line is equal to that of the fourth oblique line, and the oblique angle of the second oblique line is equal to that of the third oblique line.

20. The liquid crystal display panel of claim 19, wherein the height of the third oblique line is equal to that of the first oblique line.

21. The liquid crystal display panel of claim 19, wherein the height of the fourth oblique line is equal to that of the second oblique line.

22. The liquid crystal display panel of claim 17, wherein the first and second protrusions are located on the same line.

23. The liquid crystal display panel of claim 1, wherein the pixel electrode comprises a first side and a second side facing each other on edges of the pixel electrode in the second direction, wherein the first side comprises a first protrusion and a first oblique line formed on an upper side of the first protrusion with respect to the first protrusion, and the second side comprises a second protrusion and a second oblique line formed on a lower side of the second protrusion with respect to the second protrusion.

24. The liquid crystal display panel of claim 23, wherein the oblique angle of the first oblique line is equal to that of the second oblique line.

25. The liquid crystal display panel of claim 23, wherein the first and second protrusions are located on the same line.

26. The liquid crystal display panel of claim 25, wherein the height x1 of the first oblique line with respect to the height x of the pixel electrode formed on an upper side of the first protrusion with respect to the first protrusion is $0.2 < x1/x \leq 1$.

27. The liquid crystal display panel of claim 25, wherein the height y1 of the second oblique line with respect to the height y of the pixel electrode formed on a lower side of the second protrusion with respect to the second protrusion is $0.2 < y1/y \leq 1$.

* * * * *